No. 650,731. Patented May 29, 1900.
S. ROBERTS.
STRAINER.
(Application filed Oct. 20, 1899.)

(No Model.)

WITNESSES:
Donn Twitchell
R. Ferguson

INVENTOR
S. Roberts
BY
Munn
ATTORNEYS

THE NORRIS PETERS CO., PHOTO-LITHO., WASHINGTON, D. C.

United States Patent Office.

SYLVANUS ROBERTS, OF CHESTER, NEW YORK.

STRAINER.

SPECIFICATION forming part of Letters Patent No. 650,731, dated May 29, 1900.

Application filed October 20, 1899. Serial No. 734,215. (No model.)

*To all whom it may concern:*

Be it known that I, SYLVANUS ROBERTS, of Chester, in the county of Orange and State of New York, have invented a new and Improved Strainer, of which the following is a full, clear, and exact description.

This invention relates particularly to strainers for milk, although it may be used for straining emulsions and similar material.

The object of the invention is to provide a strainer of simple construction and having a receptacle to receive and retain dirt or other foreign matter that may be in the milk when poured into the strainer, thus preventing the dirt from entering the can with the milk.

I will describe a strainer embodying my invention and then point out the novel features in the appended claim.

Reference is to be had to the accompanying drawings, forming a part of this specification, in which similar characters of reference indicate corresponding parts in both the figures.

Figure 1:
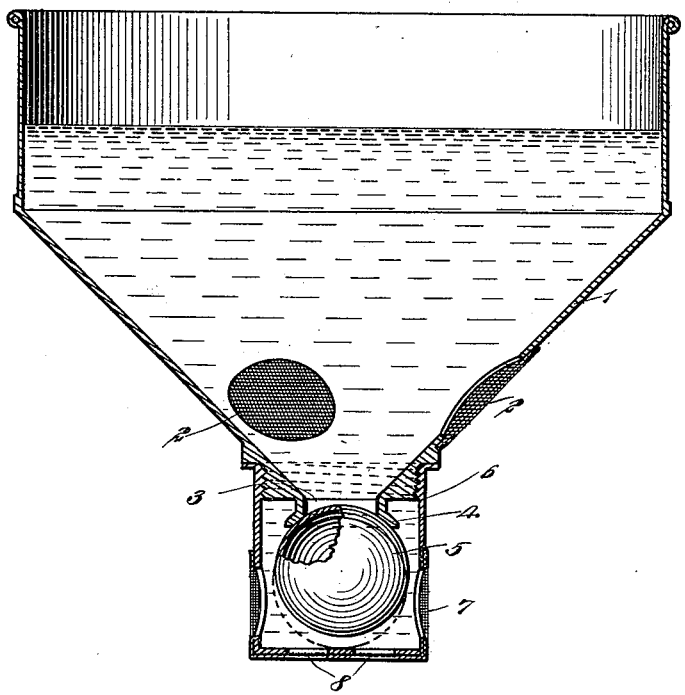
Figure 2:
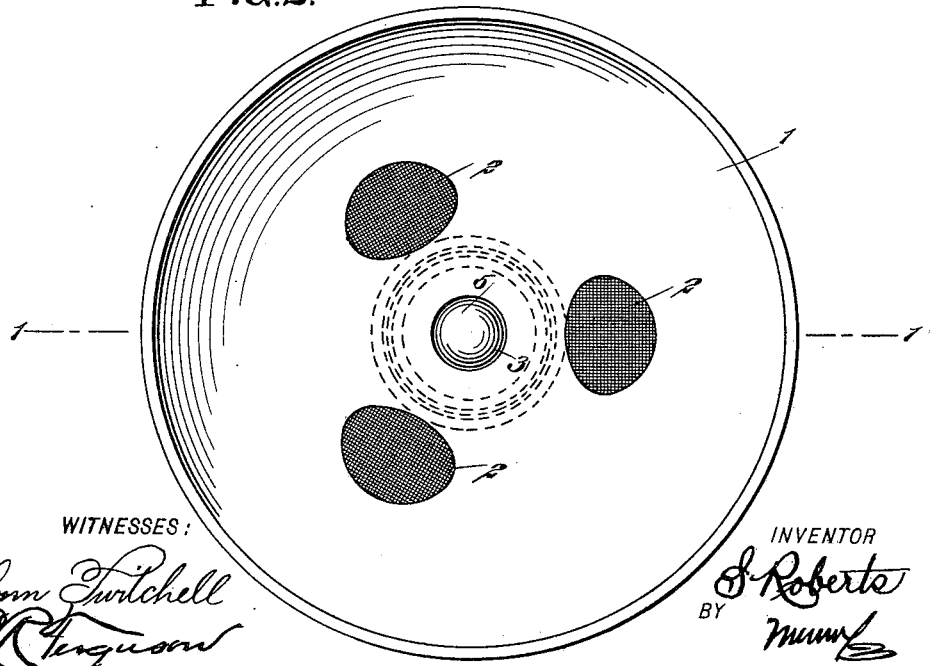

Figure 1 is a sectional elevation, on the line 1 1 of Fig. 2, of a strainer embodying my invention, and Fig. 2 is a top plan view.

The strainer comprises a funnel-like body portion 1, having netting or other strainer material 2 arranged over openings in the lower portion. An opening 3 through the bottom of the body portion has a valve-seat 4 to receive a float-valve 5, which is arranged in a cup or receptacle 6 for receiving dirt. This cup or receptacle is removably connected with the body portion and, as here shown, has a screw-thread engagement therewith. It is provided with openings through its sides, which are covered by netting or other strainer material 7, and strainers 8 may also be placed in the bottom, if desired.

The mesh of the strainers in the cup or receptacle are somewhat finer than the mesh of the strainers 2 or they may be of smaller area, the object being to permit the milk or other material strained to pass more rapidly through the strainers in the body portion than through the strainers in the receptacle or cup 6, so that the float-valve will be moved upward and held against its seat while the main body of the milk is straining through the strainers 2.

In operation the device is to be placed in engagement with a milk-can or the like, and the milk is to be poured into the body portion. A portion of this milk will of course pass into the cup or receptacle 6, moving the valve upward to its seat. The greater portion of the milk will pass through the strainers 2, and after the level of the milk reaches a point below the strainers 2 the milk, gradually passing out of the strainers 7 and 8, will permit the valve to lower, so that the milk remaining in the bottom of the body portion will pass into said cup, carrying any dirt or other foreign matter that may be contained in said milk. The milk will eventually all filter out of the receptacle or cup 6, leaving the dirt therein. Of course the dirt may be cleaned out after removing the cup from the body portion. When milk is again poured into the body portion, the valve will close, as before described, and effectually prevent the dirt contained in the cup from rising or passing back into the body portion of the strainer.

While I have shown the float-valve in the form of a ball, it is obvious that other forms of valve may be employed—such, for intance, as a plate or flap valve for engaging with the seat and supported by a float arranged in the main or body portion of the strainer. It is obvious also that my invention is not confined to the particular shape or form of the body portion 1.

Having thus fully described my invention, I claim as new and desire to secure by Letters Patent—

A strainer, comprising a body portion having sieve-covered openings in its lower portion, a cup removably attached to the lower end of the body portion and having sieve-covered outlets, and a float-valve in said cup adapted to engage in a valve-seat at the outlet of the body portion, the sieve-covered outlets of the cup being of less discharging capacity than the sieve-covered outlets of the body portion, so that material will flow less slowly through the cup-outlets than through the body-portion outlets, whereby the valve will be floated and held in its seat until the material shall have discharged into the body portion, substantially as specified.

SYLVANUS ROBERTS.

Witnesses:
 FRANK C. MARTIN,
 W. M. CRIST.